US011010467B2

(12) United States Patent
Hwang

(10) Patent No.: US 11,010,467 B2
(45) Date of Patent: May 18, 2021

(54) MULTIFACTOR-BASED PASSWORD AUTHENTICATION

(71) Applicant: BLUE POPCON CO.LTD, Seoul (KR)

(72) Inventor: Young Man Hwang, Goyang-si (KR)

(73) Assignee: BLUE POPCON CO.LTD, Seoul (KR)

( * ) Notice: Subject to any disclaimer, the term of this patent is extended or adjusted under 35 U.S.C. 154(b) by 136 days.

(21) Appl. No.: 16/174,654

(22) Filed: Oct. 30, 2018

(65) Prior Publication Data

US 2020/0134168 A1 Apr. 30, 2020

(51) Int. Cl.
| | |
|---|---|
| *G06F 21/46* | (2013.01) |
| *H04L 9/08* | (2006.01) |
| *G06F 3/0488* | (2013.01) |
| *H04L 29/06* | (2006.01) |
| *G06F 21/36* | (2013.01) |
| *H04L 9/14* | (2006.01) |

(52) U.S. Cl.
CPC .......... *G06F 21/46* (2013.01); *G06F 3/04886* (2013.01); *G06F 21/36* (2013.01); *H04L 9/0863* (2013.01); *H04L 9/14* (2013.01); *H04L 63/083* (2013.01)

(58) Field of Classification Search
CPC ...... G06F 21/46; G06F 3/04886; G06F 21/36; H04L 9/0863; H04L 9/14; H04L 63/083
See application file for complete search history.

(56) References Cited

U.S. PATENT DOCUMENTS

| | | | |
|---|---|---|---|
| 9,111,073 B1* | 8/2015 | Jiang | G06F 21/36 |
| 9,178,873 B2* | 11/2015 | Dong | H04L 63/0815 |
| 9,843,574 B1* | 12/2017 | Triandopoulos | H04L 9/3226 |
| 10,540,492 B1* | 1/2020 | Norris, III | G06F 21/36 |
| 2011/0090097 A1* | 4/2011 | Beshke | G07F 7/1041 |
| | | | 341/20 |
| 2012/0042364 A1* | 2/2012 | Hebert | G06F 21/46 |
| | | | 726/6 |
| 2013/0047238 A1* | 2/2013 | Hwang | H04L 9/3228 |
| | | | 726/7 |
| 2013/0185779 A1* | 7/2013 | Tamai | H04L 63/0838 |
| | | | 726/6 |
| 2013/0301830 A1* | 11/2013 | Bar-El | H04L 63/0823 |
| | | | 380/210 |
| 2013/0305041 A1* | 11/2013 | Bar-El | H04L 9/0894 |
| | | | 713/156 |

(Continued)

*Primary Examiner* — Joseph P Hirl
*Assistant Examiner* — Stephen T Gundry

(57) ABSTRACT

A system and method are disclosed to improve password security assigned to a user, the method comprising: a method for performing enhanced security authentication, the method comprises: generating one-time password, by a security server, by filtering original password characters, wherein a security server provides a display on a hardware display screen, in which a plurality of keys are arranged and at least one selected from the arranged keys is used to filter original password characters; storing, by a memory unit, the original password and the one-time password generated; determining, by the security server, whether a user's password entered on the hardware display screen be accepted by comparing the entered password with the one-time password. The system comprises a storage module and a computer program for performing the method.

16 Claims, 10 Drawing Sheets

(56) References Cited

U.S. PATENT DOCUMENTS

| | | | |
|---|---|---|---|
| 2014/0028709 A1* | 1/2014 | Baker | G06F 40/242 345/629 |
| 2014/0201831 A1* | 7/2014 | Yi | G06F 21/556 726/19 |
| 2014/0237565 A1* | 8/2014 | Fleysher | H04L 63/083 726/6 |
| 2015/0154414 A1* | 6/2015 | Pike | G06F 21/62 726/30 |
| 2015/0172273 A1* | 6/2015 | Dong | G06F 21/00 726/7 |
| 2015/0205942 A1* | 7/2015 | Yang | H04L 63/083 726/19 |
| 2016/0065562 A1* | 3/2016 | Guo | G06F 3/0236 726/5 |
| 2016/0078216 A1* | 3/2016 | Chougle | H04L 63/0876 726/26 |
| 2016/0092877 A1* | 3/2016 | Chew | G06Q 20/4012 705/72 |
| 2016/0117494 A1* | 4/2016 | Kaplan | G06F 21/31 726/18 |
| 2016/0117510 A1* | 4/2016 | Yi | H04L 63/0838 713/189 |
| 2016/0212119 A1* | 7/2016 | Yang | H04L 9/3226 |
| 2017/0003871 A1* | 1/2017 | Broomhall | G06F 3/04886 |
| 2017/0220790 A1* | 8/2017 | Fonseca | G06F 21/36 |
| 2017/0235962 A1* | 8/2017 | Clark | G06F 3/04886 726/26 |
| 2017/0249450 A1* | 8/2017 | Lawrenson | G06F 21/36 |
| 2017/0329944 A1* | 11/2017 | Satyavarapu | H04L 63/10 |
| 2018/0191702 A1* | 7/2018 | Padmanabhan | G06F 21/36 |
| 2018/0285549 A1* | 10/2018 | Sonkar | G09C 5/00 |
| 2019/0147158 A1* | 5/2019 | Ohkado | H04L 63/083 726/19 |
| 2020/0004949 A1* | 1/2020 | Tyers | G06F 3/02 |
| 2020/0065469 A1* | 2/2020 | Norris, III | G06F 21/36 |
| 2020/0084030 A1* | 3/2020 | Nendell | H04L 63/083 |
| 2020/0112585 A1* | 4/2020 | Keohane | G06F 21/316 |

\* cited by examiner

[FIG. 1]
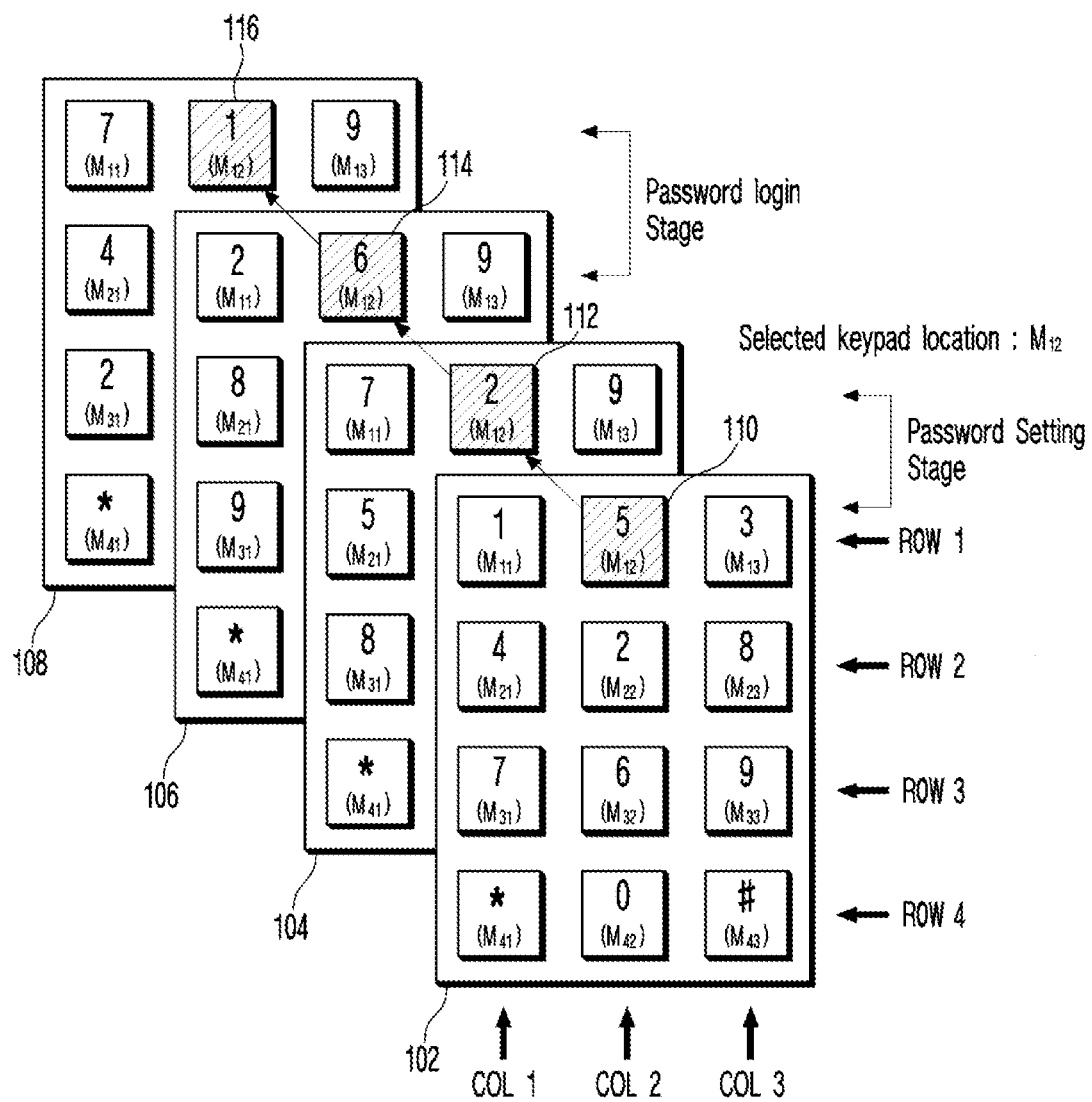

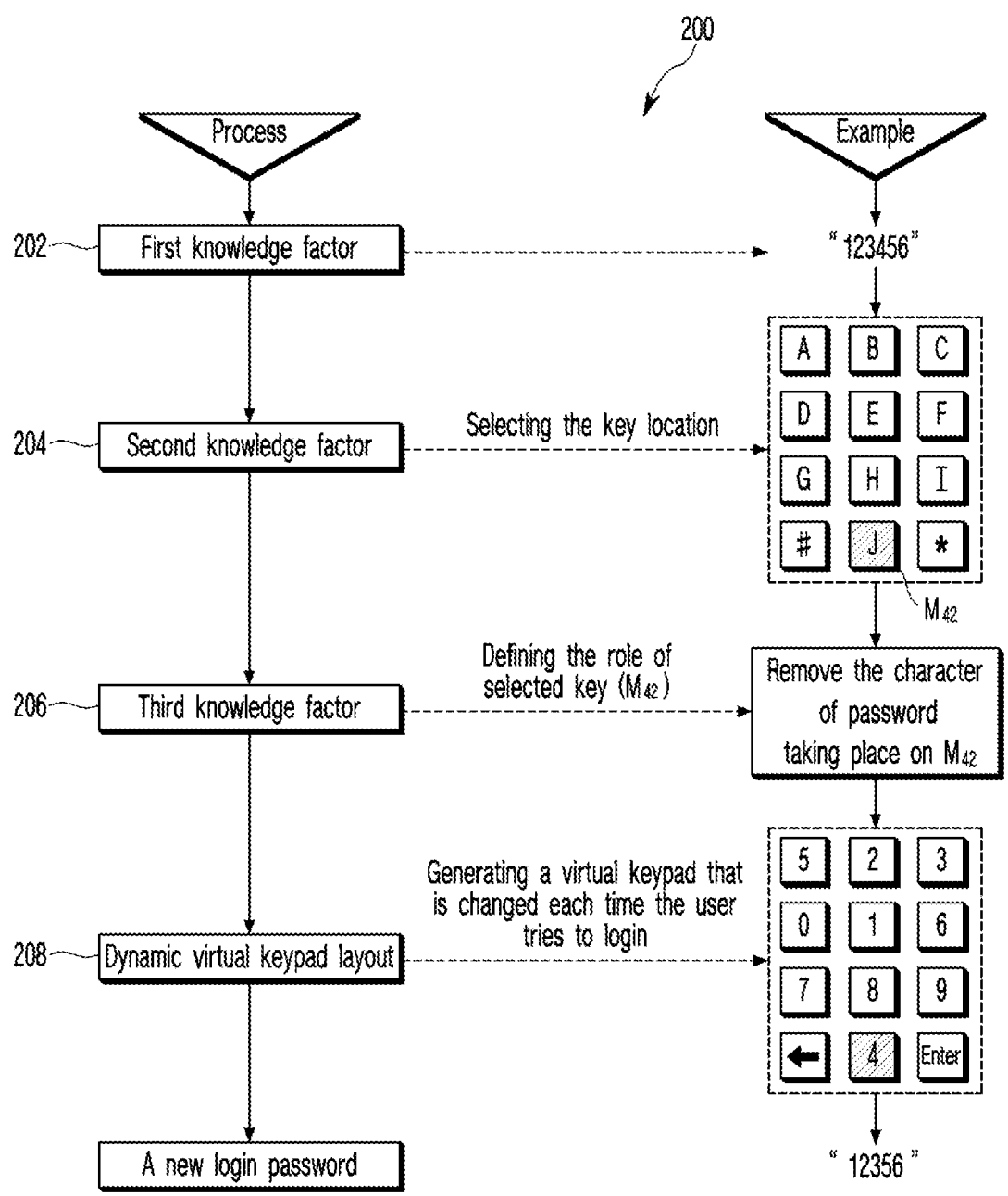

【FIG. 3】
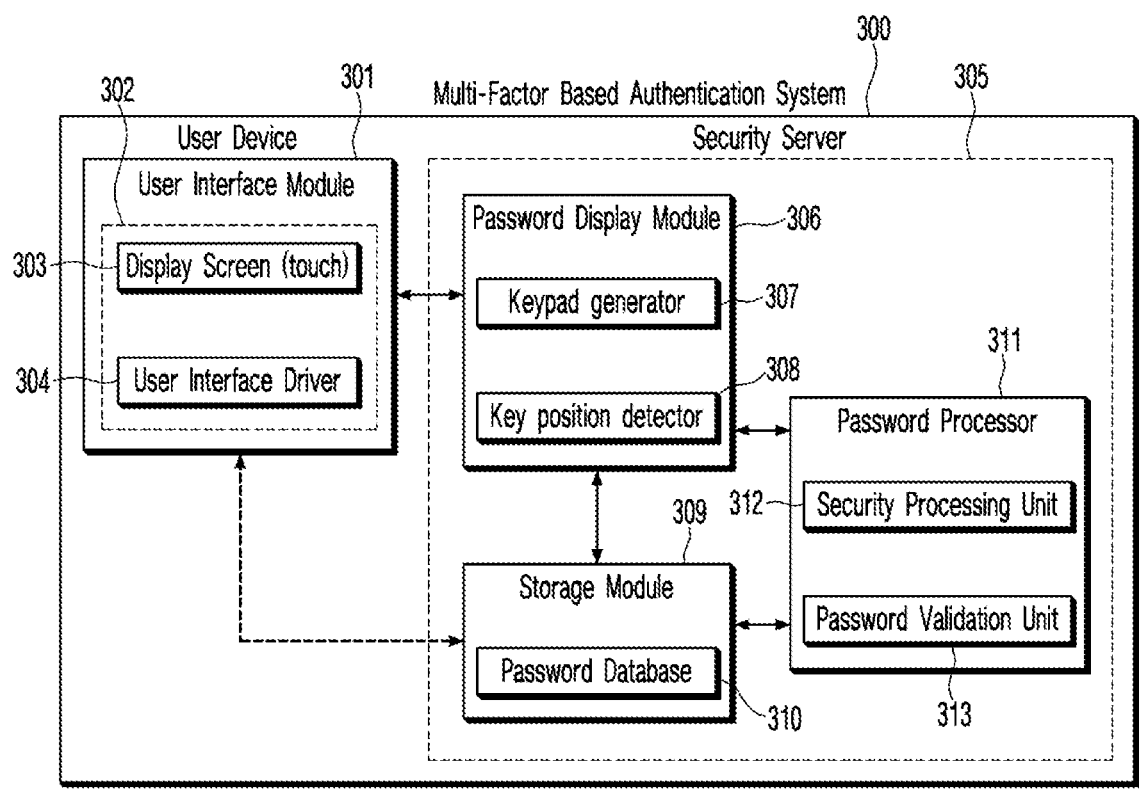

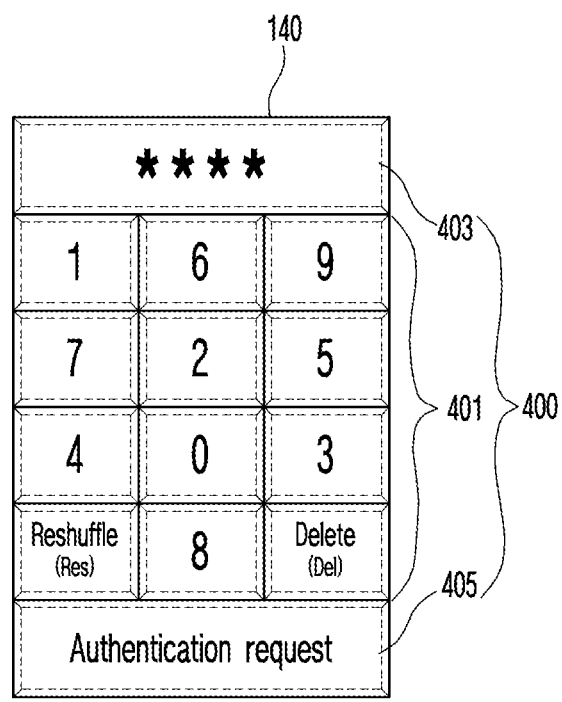

【FIG. 5】

| ★★★★ | | |
|---|---|---|
| 1 ($M_{11}$) | 6 ($M_{12}$) | 9 ($M_{13}$) |
| 7 ($M_{21}$) | 2 ($M_{22}$) | 5 ($M_{23}$) |
| 4 ($M_{31}$) | 0 ($M_{32}$) | 3 ($M_{33}$) |
| Reshuffle (Res) | 8 ($M_{42}$) | Delete (Del) |
| Authentication request | | |

[FIG. 6]

| ✱✱✱✱ | | |
|---|---|---|
| 3 ($M_{11}$) | 0 ($M_{12}$) | 5 ($M_{13}$) |
| 7 ($M_{21}$) | 6 ($M_{22}$) | 9 ($M_{23}$) |
| 4 ($M_{31}$) | 1 ($M_{32}$) | 8 ($M_{33}$) |
| Reshuffle (Res) | 2 ($M_{42}$) | Delete (Del) |
| Authentication request | | |

[FIG. 7]

| | | |
|---|---|---|
| ✱ ✱ ✱ | | |
| 3 (M₁₁) | 9 (M₁₂) | 5 (M₁₃) |
| 7 (M₂₁) | 6 (M₂₂) | 0 (M₂₃) |
| 4 (M₃₁) | 1 (M₃₂) | 8 (M₃₃) |
| Reshuffle (M₄₁) | 2 (M₄₂) | Delete (M₄₃) |
| Authentication request | | |

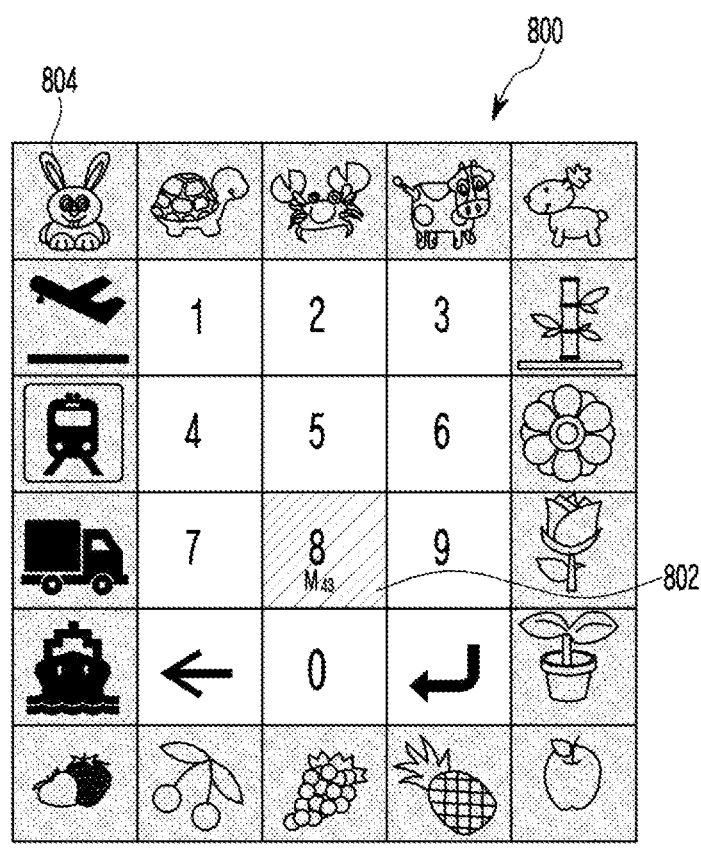
[FIG. 8]

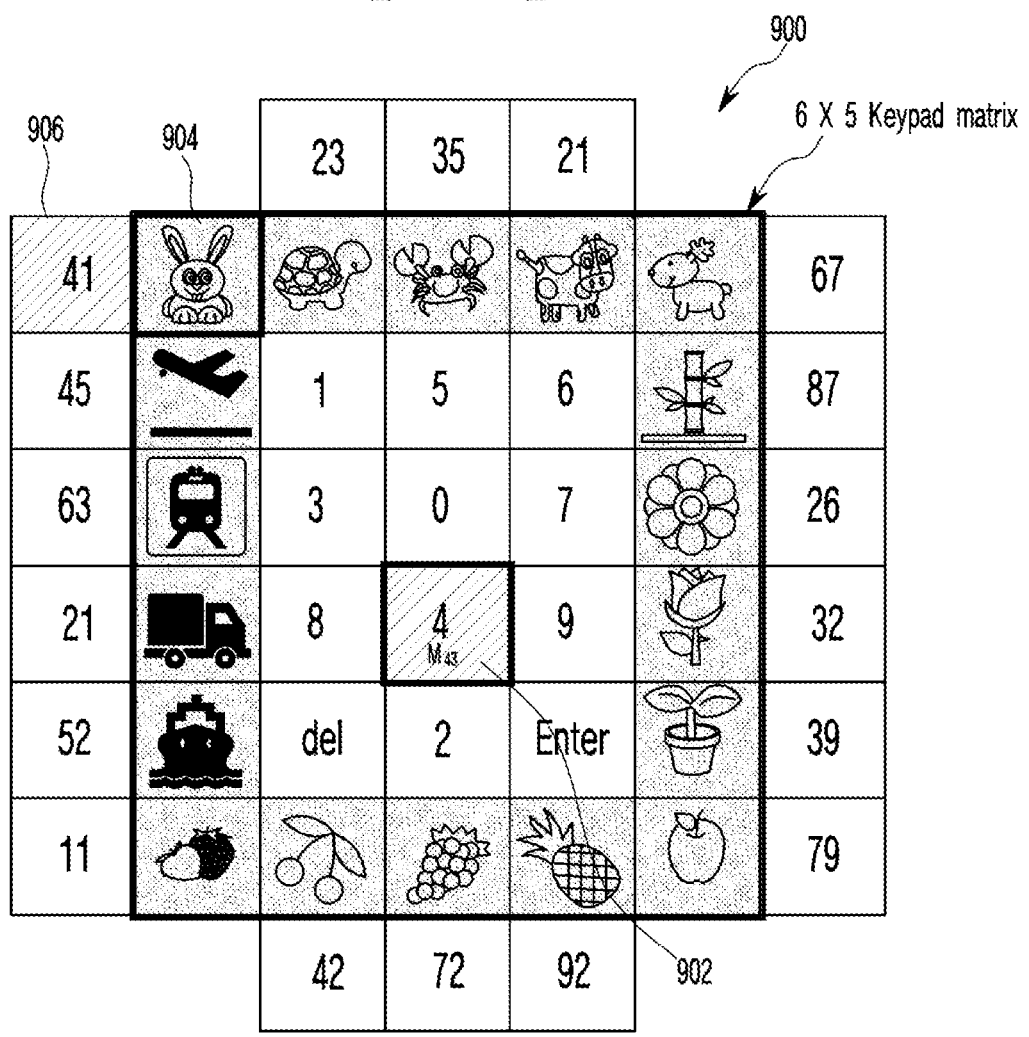
[FIG. 9]

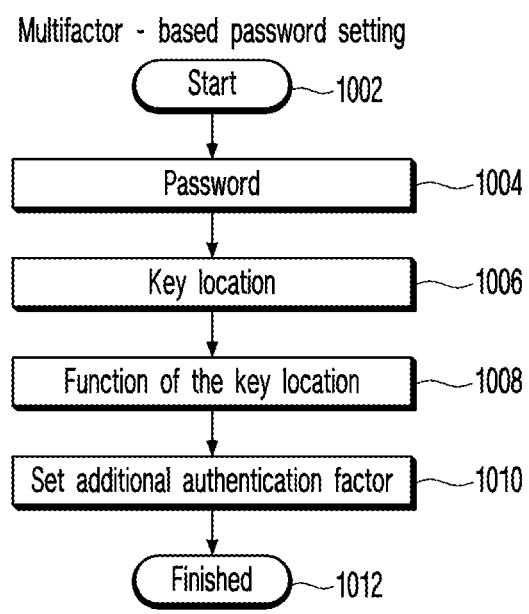

US 11,010,467 B2

MULTIFACTOR-BASED PASSWORD AUTHENTICATION

TECHNICAL FIELD

The present application generally relates to an improved security authentication apparatus and method and more specifically to a mechanism for safer logins.

BACKGROUND OF THE INVENTION

A basic authentication method of confirming an ID for proving "a right person" to login to a secured data system and a password based on "what do you know?" is mostly used. For instance, user name or IDs, passwords, PINs and the answer to secret questions are most widely used due to its cheap expense and simple application as compared with other authentication methods. Such a basic authentication method has been settled and used for a long period.

However, in the existing basic logins method, since a user always uses the same ID and password, the ID and password are easily exposed to attackers by accident as the number of times of using digital devices in public places is frequent in recent years. Further, the ID and password become a final target to be attacked by hackers who maliciously wiretap contents on wire/wireless communication, which results in many security problems and accidents.

Furthermore, since a high-priced security system, such as an OTP or biometric authentication, additionally used to solve such security problems and accidents, users are additionally burdened with not a little cost.

To solve this issue, multi-factor authentication becomes an effective supplement to passwords. It adds a second layer of protection requiring users to enter either something they know or something they have to verify a user's claimed identity before granting access to a secured system.

SUMMARY OF THE INVENTION

In one aspect of the present invention, a method for performing enhanced security authentication, the method comprising: generating a login password, by a security server, by filtering a user password characters, wherein at least one selected key location in the keyboard layout that is displayed on a hardware display screen is used to filter the user password; storing, by a memory unit, the user password and the login password generated; and determining, by the security server, whether a password entered by the user on the hardware display screen is valid to access a secured system by comparing the entered password with the login password generated.

In another embodiment of the invention, the method further comprising allowing the user, by the security server, to enter the user password using a virtual keyboard, a mouse, or a physical keyboard electrically connected to the security server.

In another embodiment of the invention, the method further comprising, providing, by the security server, the keyboard layout that is arranged in a manner that guides the user how to enter the user password to log in the secured system.

In another embodiment of the invention, the method further comprising, each of the keys in the keyboard layout indicates numbers, symbols, or figures comprising the user password to be entered on the hardware display screen.

In another embodiment of the invention, the method further comprising, an arrangement of the keys displayed on the hardware display screen changes each time the user tries to log in the secured data system.

In another embodiment of the invention, a system for performing enhanced security authentication, the system comprises: a terminal configured to output a keyboard layout on a hardware display and receive a password from a user attempting to access a secured data system, a security server configured to generate a login password by filtering a user password stored, wherein at least one selected key location in the keyboard layout is used to filter a user password, and determine whether the password entered from the user is valid for the user to access by comparing the entered password with the login password generated.

In another embodiment of the invention, the system further comprises the terminal configured to allow the user to enter the password using a virtual keyboard, a mouse, or a physical keyboard electrically connected to the security server.

In another embodiment of the invention, the system further comprises the security server configured to perform a security process by providing the keyboard layout that is arranged in a manner that guides the user how to enter the user password to log in the secured system.

BRIEF DESCRIPTION OF THE DRAWINGS

The invention, as well as preferred mode of use and further objectiveness and advantages thereof, will best be understood by reference to the following detailed description of illustrative embodiments when read in conjunction with the accompanying drawings, wherein:

FIG. 1 depicts an exemplary screen for setting a multifactor-based password according to an embodiment of the present invention;

FIG. 2 is a flowchart depicts multifactor-based password setting and the application of the multifactor-based password;

FIG. 3 depicts a conceptual diagram of a processing system to proceed multifactor-based authentication according to an embodiment of the present invention;

FIG. 4 depicts an exemplary virtual keypad layout on a hardware screen for receiving a password from a user attempting to access a secured system according to an embodiment of the present invention;

FIG. 5 depicts an exemplary diagram illustrating a screen for receiving a multifactor-based password according to an embodiment of the present invention;

FIG. 6 depicts an exemplary diagram illustrating a screen for receiving a multifactor-based password according to an embodiment of the present invention;

FIG. 7 depicts another exemplary diagram illustrating a screen for receiving a multifactor-based password according to an embodiment of the present invention;

FIG. 8 depicts another exemplary diagram illustrating a screen for setting multifactor based password according to an embodiment of the present invention;

FIG. 9 depicts an exemplary diagram illustrating a screen for receiving a multifactor-based password according to an embodiment of the present invention according to an embodiment of the present invention; and FIG. 10 is a flow diagram depicting the sequence of multifactor-based password setting according to an illustrative embodiment.

DETAILED DESCRIPTION OF THE INVENTION

FIG. 1 depicts an exemplary screen for setting a multifactor-based password according to an embodiment of the present invention. As shown in FIG. 1, once the user initiates the key location setting, 4×3 virtual keypad matrix may be displayed on the display screen 303 of the device 301. The keypad 4×3 features a total of 12 virtual keys in a matrix form, having a telephone-type keypad with additional two functional virtual keys. Regarding the matrix type keypad, it can be a varied, such a 4×4 or 5×5 displaying a telephone-type keypad with other four or six functional buttons. In such a virtual keypad matrix, each key may be identified by its location along the column and row number of the array. For instance, M row/column indicates a static position of the keys in the keypad matrix layout displayed on a display screen 303. And, once the user selects one of the numeric keys, the scan code, relating to the position of the selected key may be transmitted to a security server 305 and be stored in a storage module 309. Then the scan code stored may be retrieved for creating a new login password by the security server 305 for confirming a user's claimed identity. Also, the virtual keypad matrix may dynamically change each time users to login. Also, after each click event of a user the arrangement of the keys of the virtual keypad may be changed.

In the first screen of FIG. 1, when a user touches "5," the keyboard may then send a scan code of "$M_{12}$" to the validation server (as shown in FIG. 3), and the scan code of "$M_{12}$", may be used for generating a new login password. The storage module 309 in the security server 305 may memorize the scan code "$M_{12}$."

And every new login may ask for a new login password that is generated when "$M_{12}$" (a selected key location) applied to a user application. For instance, the security server 305 may generate a valid password by removing the character in the user password positioning on "$M_{12}$" in the keyboard matrix layout. Further, according to the present invention, at the password setting stage, the arrangement of the keys may be shuffled in the matrix layout each time a user clicks to login. As such, at the static position such as $M_{12}$ various numerical keys "5" and "2" may be positioned after each click event of the user or each time the user accesses a related server.

Likewise, at the password login stage, each time a user clicks to login, the arrangement of the keys may be shuffled on a display screen 303. As such, at the static position such as $M_{12}$ various numerical keys "6" and "1" may be positioned after each click event of the user or each time the user accesses a security server 305.

According to one embodiment of the present invention, the keypad layout in FIG. 1. can be the virtual keypad layout having the same matrix layout between the password setting stage and the password login stage thus allowing a user to quickly refresh the memory about the location of his or her selected key. Further, although the 4×3 virtual keypad matrix is described here, the present invention is not limited to it. That is, the setting screen may be configured with a virtual keypad matrix in which images, e.g., fruit images are arranged in a 6×5 virtual keypad matrix as shown in FIG. 8.

Further, the virtual keypad matrix may be a numeric and symbolic keyboard layout, an alphabetic character keyboard layout, an alphanumeric keyboard layout, an alphabetic character and symbolic combined keyboard layout, a symbolic keyboard layout, or a phonetic symbolic keyboard layout. Also, the virtual keyboard layouts are combined and used with the auxiliary function keys, such as a Shift key, a Tab key, a Control/Ctrl key, a Backspace key, direction keys, an Enter key, and an Esc key.

FIG. 2 is a flowchart depicting multifactor-based password setting and the application of the multifactor-based password. Briefly, the steps 202 through 206 describe the setting stage collecting multiple factors to convert a user password to a login password. The step 208 describes how to enter a login password (multifactor-based password) relying on the three factors to a keypad matrix displayed on a display screen 303. Here, as an embodiment of the present invention, the keypad matrix may be a virtual keypad matrix layout such that a user is allowed to press the relevant keys for setting or log in a password.

At step 202, a user has a user password, as a first knowledge factor, a sequence of numeric characters "123456." At step 204, a user may be allowed to select at least one key location in the keypad, as a second knowledge factor. In addition to given matrix keypad layout, as an embodiment of the present invention, the user may be allowed to choose the type of virtual keypads, such as 4×3 keypad matrix or 4×4 keypad matrix displayed on the hardware screen of the user device.

At step 204, the user pressed the key at a fourth row and second column ("$M_{42}$") in 4×3 virtual keypad matrix. But the user may also type a key location, naming keys along the row and column number, instead of the pressing. Also, the arrangement of keys in the key matrix may be shuffled, but the keypad matrix may not change.

At step 206, as a third factor, the user may be allowed to define what to do when password character is placed on the selected key location, which is $M_{42}$. The user may be allowed to skip the character entering on the selected key location or replace it with other preset characters for proving the user's valid identity. As to what to do with a user selected location of the key in the keypad layout, the user may be allowed to define his or her selected key as a filter key in that may remove the character taking the place on the filter key when presenting the password. Also, the selected key may replace the character with other characters according to the user's present manner.

At step 208, according to one illustrative embodiment of the present invention, a virtual keypad receiving a user password may be generated dynamically each time the user tries to access to the system. Also, the arrangement of the keys of the virtual keypad are shuffled after each click event of the user. But also, to make remembering the second factor—the location of the selected key—easier, the screen receiving a password may display the keypad layout that is same or very similar to what the user has used in setting the selected key location. For instance, like the keypad used at step 204, the generated virtual keypad layout may have the same 4×3 matrix layout.

A step 208 depicts how a new login password is created from the combination of three knowledge factors: (1) a user's password, (2) the user's selected key location in a keypad matrix on a display screen 303, and (3) the function of the user selected key when entering the user password. Here, to login or other transaction, a user should possess a valid user's password first, which is "123456." Besides, the login is permitted when the user removes "4" when entering the password "123456" on the dynamic virtual keypad according to the second and third factors. As such, even if an attacker manages to learn the user's password, it is useless without also having possession of the additional authentication methods as detailed above.

FIG. 3 depicts a conceptual diagram of a processing system to proceed multifactor-based authentication according to an embodiment of the present invention. The data processing system may be accessed by a workstation or central processing unit (CPU) operated by a user via an input mechanism (not shown, such as a keyboard, number pad, or mouse, singularly or in combination. A user's display device may provide feedback to the user for entering information into the data processing system.

Multifactor-based authentication system 300 may comprise user device 301 and a security server 305. The user device may include a user interface module 302. And, the user interface may allow a user to enter a user password, a location of the user's selected key displayed on display screen 303. It also may be configured to receive the function of the selected key location. The user interface module 302 may include a hardware display screen 303 and a user interface driver 304 for generating a virtual keyboard on a hardware display screen 302 integrated into the user's device 301. A key selection may be performed when a user touches or presses the key on a keyboard displayed on the touch screen display 303.

The operation of the display screen 303 may be controlled by a user interface driver 304. The user interface driver 304 may be configured to detect a user selected key(s) and record the coordinates of each selected key on a matrix shaped keyboard layout, and various ways may be used.

User interface driver 304 interfaces to the security server 305 that comprises a plurality of functional units. According to some exemplary implementations, the user interface driver 304 may be configured to generate a keypad layout such as depicted in FIG. 1, wherein the type and size of keypad arrangement may be varied in responding to the user's request.

At the user's password setting stage, the user interface driver 304 may receive a user selected key position via touch screen-display 302. Also, the user interface driver 304 may provide a keypad matrix layout or a keyboard matrix layout on the touch screen display in response to a user's request. A user interfaces driver 304 also may be configured to provide the available functions of the selected key location that is stored in storage module 309 to the user, and also receive the user's corresponding selection. A user interfaces driver 304 also may be configured to receive the user typed or entered request relating to the function of the selected key location and send the related data to the storage module 309.

The security server 305 may include a password display module 306 to direct the generation of a dynamic virtual keypad layout on a display screen 303 so that arrangement of keys in the keypad shuffled after each time a user accesses the security server 305. The keypad generator 307 may generate a matrix table layout, wherein individual keys are arranged on the matrix of horizontal and vertical paths. The keypad generator 307 may be further configured to provide a dynamic virtual keypad matrix as detailed in FIG. 1.

The key position detector 308 may be configured to detect a user selected key position in the virtual keypad matrix on a display screen 303, which is related to the second knowledge factor. More precisely, once a key is selected by a user, the selected key's position in the keypad matrix may be registered or saved by a touchscreen driver 304, which then sends the scan code of the selected position to a key position detector 308. Then, the key position detector 308 may display a key clicked to draw the user's attention and to determine the location of the pressed key—its corresponding rows and columns number of pressed key—on the display screen 303.

The security server 305 may include a storage module 309 for storing a user password. The storage module 309 may store data related to a user selected key location in the generated keypad on the display screen 303—the second knowledge factor. The storage module 309 may further be configured to save a programmable logic data relating to the function of the selected key when entering a user password into the virtual keypad—the third knowledge factor.

The security server 305 may comprise a password processor 311 generating a new login password to confirm a user claimed identify using the three know factors: the user's password, the user's selected key position, the function of the selected key when entering the user's password. The password processor 311 may provide general processing functions, including the execution of software stored on the storage module 309. The software includes instructions that when executed by the password processor 311 cause the multifactor-based authentication system 300 to perform the various functions presented through this disclosure.

The password processor 311 may include a password validation unit 313 configured to verify whether or not a device user's entered password is valid by comparing the entered password to a new login password generated based on the three knowledge factors: the user password, the user's selected key position and the function of the selected key when the character of the user password places on the selected key position. The multifactor-based authentication system 300 may further include a security processing unit 312 to determine whether to allow or prevent access by the user attempting to access a secured data system upon receiving the comparing analysis from the password validation unit 313. The data about the three knowledge factors may be stored in the password database 310.

FIG. 4 depicts an exemplary virtual keypad receiving a password in accordance with the present invention. At the keypad grid touch screen 401 keys are randomly arranged in a matrix form and this grid is read from 1 to 9 like the numerical keypad on personal PC keyboard. In accordance with the present invention, the virtual keypad may further include "reshuffle" key for requesting a new arrangement of numerical keys and a "delete" key for removing the previously entered keys. By clicking on this keypad grid, a user may enter the user's password to access to the secured data system.

The display panel 403 is configured to display the characters of the password entered by the user each time in order. The display panel 403 may further be configured to display a special symbol, such as star-shaped symbol, to hide each character of the password entered by the user. When the user realizes he or she has entered a wrong character so hit "delete" key before hitting "Authentication request" key, it may erase the last wrong character entered or entire password. In a case where the user desires another arrangement of numerical keys, the user may click on the "reshuffle" key that may display the rearranged keypad layout as depicted in FIG. 1. "Authentication request" key may send the user selected key displayed on the display panel 403 to password validation unit 313 via key position detector 308 such that password validation unit 313 may be able to compare the entered password on the display panel 403 with the password generated from the password validation unit 313.

FIG. 5 depicts an exemplary diagram illustrating a screen for receiving a multifactor-based password according to an embodiment of the present invention. The technical features of the virtual keypad are the same as detailed in FIG. 4. Before discussing a user identification in FIG. 5, the corresponding two-factor password authentication setting is as follows:

Although not depicted here, in the password setting stage, the user may enter a user password via the display screen 303. For instance, a display screen 303 may have allowed the user to set a combination of numbers "720201" as a user password to log in. Then, the user may have selected the key location at the intersection of the third row and second column ("$M_{32}$", a hatched cell) in the 4×3 matrix keypad. And then, the user interface driver 304 may have allowed the user to set a role of the selected key location. The default role of the key location can be removal of the character of the password positioned in that place.

As a user identification stage begins, the user interface driver 304 may present virtual keypad receiving an original password on a password entry screen in accordance with present invention. a security authentication screen based on those sets, a new login password generated through the key location is "7221" given that the numeric character "0" from "720201" becomes located on $M_{32}$, and as a result of this, "0" is removed.

FIG. 6 depicts an exemplary diagram illustrating a screen for receiving a multifactor-based password according to an embodiment of the present invention. Like FIG. 5, a user has created a password: the series of numbers "720201." And, the user designed a key location at the intersection of the third row and second column ("$M_{32}$", a hatched cell) in the 4×3 matrix keypad. The default application of the (key) location was filtering the character of the password positioning on the (key) location in the virtual keypad matrix.

However, based on the key location arrangement of virtual keyboard differing from FIG. 5, a new login password generated through the filter key is to be "72020" given that the numeric character "1" from "720201" becomes located on $M_{32}$, and as a result of this, "1" is then removed.

FIG. 7 depicts another exemplary diagram illustrating a screen for receiving a multifactor-based password using a plurality of key locations according to the present invention. Like FIGS. 5 and 6, a user has created a user password: the series of numbers "720201." However, unlike FIGS. 5 and 6, the user also designed two key locations at the intersection of a second row and a third column and the intersection of a second row and third column ("$M_{21}$" and "$M_{23}$", hatched cells) in the 4×3 matrix keypad. The default application of the key location is filtering the character of the password positioning on the key location in the virtual keypad matrix.

Based on the two key locations in the virtual keyboard, a password generated through the two key locations is "221" given that the numeric character "7" and "0" from "720201" are located on $M_{21}$ and $M_{23}$, respectively. As a result of this, "7" and "0" are removed and only the user entering "221" on a given virtual keypad matrix is permitted to log in.

FIG. 8 depicts another exemplary diagram illustrating a screen for setting multifactor-based password according to an embodiment of the present invention. In FIG. 8, a virtual keyboard layout 800 may be appeared on a display screen 303, thus allowing a user to set a key location for generating a login password.

At a multifactor-based password setting stage, a user password "0145 can be saved through a virtual keyboard layout 800 or other input device integrated into the user device 301. Also, the user interface driver 304 may also allow the user to enter "0145" as a login password, a first knowledge factor, via a display screen 303. The entered login number may then be saved in storage module 309, and later transmitted to a password validation unit 313 to be used in creating a login password in collaboration with the other authentication factors by password validation unit 313.

In general, setting a key location in the keyboard may not turn on and a user can turn the setting on his or her device. And, to make the setting of key location available for a user, generally turn on may be used in the user interface or control panel, whereas enable is used for a command line connecting the device to the server.

As shown in FIG. 8, once the multifactor-based password setting is initiated, 6×5 virtual keyboard matrix may be displayed on the screen of the device. The keypad 6×5 features a total of 30 virtual keys in a matrix form, including a 4×3 telephone-type keypad matrix surrounded by total 18 image symbol keys.

The 4×3 keypad matrix may dynamically change each time users access the security server 305. Also, after each click event of a user, the arrangement of the keys in the 4×3 matrix may be changed. The 18 image symbol keys also may be rearranged among themselves each time users access the security server 305 or responding to the user's request.

Here, each key may be identified by its location along the column and row number of the keyboard matrix. To make it easier to understand, M row/column indicates a static position of the keys in the 6×5 keypad matrix layout 800. The user interfaces driver 304 may also allow the user to select a key location—the intersection of a fourth row and a third column ("$M_{43}$")—on the 6×5 keyboard matrix layout 800. Once the user has selected the key location, a key position detector 308 may receive the data of the selected location (a hatched cell) 802 from the user interface driver 304. And the received data may then be saved in storage module 309, and then transmitted to a password validation unit 313 to be used in creating a login password.

Although the matrix screen in FIG. 8 does not show, the user interface driver 304 may then also allow the user to define the role of the selected key location ("$M_{43}$") via a user interface 301. For this purpose, the user interface 302 may be configured to allow the user to provide the instruction via a display screen 303, a keyboard (not shown), and mouse (not shown) etc., through which the user interacts with the security server 305.

Here, the user may select a rabbit symbol 804 to replace the character of the user password positioning on the key location, "$M_{43}$." For instance, in responding to the user input, password validation unit 313 may replace the character of the original password placed on the selected key location with a character left adjacent to the rabbit symbol on a dynamic virtual keyboard screen.

And, for receiving the user's definition of the role of the key location, the user interface 302 may be configured with a display screen 303, a keyboard (not shown), and mouse (not shown) etc., through which the user interacts with the multifactor-based authentication system 300. Then, the data of the selected a rabbit symbol 804 along with additional instruction may then be transferred to storage module 309 to be retrieved for generating a login password by the password validation unit 313.

FIG. 9 depicts an exemplary diagram illustrating a screen for receiving a multifactor-based password according to an embodiment of the present invention according to an embodiment of the present invention. More precisely, it depicts how the selected key location would make the play in the login keyboard layout in responding to a password setting in FIG. 8.

In addition to the virtual keyboard layout in FIG. 8, the sets of image symbol keys may be further equipped with additional numeric or symbol keys. Here, the keyboard layout 900 is surrounded by additional sets of numeric keys outside along with their horizontal or vertical axis, respectively. The password database contains the data about (1) a user password "0145" and (2) a user-selected key position ("$M_{43}$") in the 6×5 keypad matrix layout, (3) a user selected symbol "rabbit" key, and (4) an additional authentication factor: what needs to be done when the character of the user password that is placed on the selected key location: the character left adjacent to the "rabbit" key would replace the character placed.

The password validation unit 313 may retrieve those-above data from password database 310 and the data regarding the virtual keyboard layout 900 displayed on the display screen 303. Then, based on those collected data, the password validation unit 313 will generate a password "01415" given that "41" is positioned to the left side of "rabbit" symbol the user has selected.

FIG. 10 is a flow diagram depicting the sequence of multifactor-based password setting according to an illustrative embodiment. This diagram includes a user who is operating any suitable computing device such as a desktop computer, laptop computer, mobile telephone, tablet computer, etc., and a password management server that is connected to the computing device via typically an internet website to which the user wishes to connect and login, and the password management server.

At step 1002, a user attempting to set up multi factors-based password setting may activate the relevant setting using his or her terminal device. At step 1004, when the user is working on a trusted device, a user may be asked to enter a user password. Upon the user entering a valid password, the multifactor—based authentication system 300 provides a virtual keyboard layout on a hardware display screen 303 of user device 301.

At step 1006, upon virtual keyboard matrix layout displayed, the multifactor-based authentication system 300 may ask the user to select the location of the key in the keyboard (keypad) matrix layout.

At step 1008, the user may be asked to define the function of the selected key using the user interface 302. When selection is made on the key in the keyboard multifactor-based authentication system 300 may ask the user how to apply the selected key in the keyboard matrix layout. In this regard, for receiving the user's instruction, the user interface 302 may be configured with a display screen 303, a keyboard (not shown), and mouse (not shown), etc., through which the user interacts with the multifactor-based authentication system 300. The user may be allowed to type the specific instruction regarding the role of the selected key or selects one of the roles presented on the display screen 303. And, as a default, the role of the selected key location may remove the character of the user password that is placed on the selected key location.

At step 1010, the user may be asked to additional authentication factor. The keyboard multifactor-based system may allow the user to set additional authentication factor upon the user's request. At step 1012, upon completion of the setting at step 1010, the multifactor-based authentication system 300 may be enabled.

What is claimed is:

1. A method for performing enhanced security authentication, the method comprising:
    displaying a virtual keyboard having a key on display;
    generating a login password, by a security server, by applying a user password characters, wherein at least one selected key location in the virtual keyboard layout displayed on a hardware display screen is used to change a length of the user password, wherein the virtual keyboard with a different layout of the keys is displayed every time after each login session;
    storing, by a memory unit, the user password and the login password generated; and
    determining, by the security server, whether a password entered by the user on the hardware display screen is valid to access a secured system by comparing the entered password with the login password generated.

2. The method according to claim 1, further comprising allowing the user, by the security server, to enter the user password using the virtual keyboard, a mouse, or a physical keyboard electrically connected to the security server.

3. The method according to claim 1, further comprising: providing, by the security server, the keyboard layout that is arranged in a manner that guides the user on how to enter the user password to log in to the secured system.

4. The method according to claim 1, each of the keys in the keyboard layout indicates numbers, symbols, or figures comprising the user password to be entered on the hardware display screen.

5. The method according to claim 1, wherein an arrangement of keys in the keyboard layout and the user selected key location are used to remove a character of the user password that is placed on the selected key location.

6. The method according to claim 1, wherein an arrangement of keys in the keyboard layout and the user selected key location in the keyboard layout are used to replace a character of the user password that is placed on the selected key location.

7. The method according to claim 6, the user is allowed to direct the server how to replace the character of the user password placed on the selected key location when generating the login password.

8. The method according to claim 1, wherein respective positions of all keys in the virtual keyboard remain unchanged when the user password is entered during one login session.

9. A system for performing enhanced security authentication, the system comprising:
    a terminal configured to output a virtual keyboard layout on a hardware display and receive a password from a user attempting to access a secured data system,
    a security server configured to
    generate a login password by filtering a user password stored, wherein at least one selected key location in the keyboard layout is used to change a length of a user password, wherein the virtual keyboard with a different layout of the keys is displayed every time after each login session; and
    determine whether the password entered from the user is valid for the user to access by comparing the entered password with the login password generated.

10. The system according to claim 9, wherein the terminal is further configured to allow the user to enter the password using the virtual keyboard, a mouse, or a physical keyboard electrically connected to the security server.

11. The system according to claim 9, wherein the security server is further configured to perform a security process by providing the keyboard layout that is arranged in a manner that guides the user how to enter the user password to log in to the secured system.

12. A system according to claim 9, each of the arranged keys indicates numbers, symbols, or figures comprising the user password characters to be entered on the hardware display screen.

13. The system according to claim 9, wherein the plurality of keys are arranged in the keypad layout, and the security server is further configured to use the selected key location in the keyboard layout to remove the character of the user password that is placed on the selected key location.

14. The system according to claim 9, wherein the plurality of keys are arranged in the keypad layout and the security server is further configured to use the user selected key location in the keyboard layout to replace the character of the user password that is placed on the selected key location with a character that a user has defined.

15. The system according to claim 14, the security server is further configured to receive an instruction from a user setting a login password on how to replace the character of the user password that is placed on the selected key location.

16. The system according to claim 9, the security server is further configured to generate a login password as same as the user password when none of the characters of the user password is placed on the selected key location.

* * * * *